(12) United States Patent
Ohshitanai

(10) Patent No.: US 9,426,398 B2
(45) Date of Patent: Aug. 23, 2016

(54) SOLID-STATE IMAGE SENSOR AND CAMERA

(71) Applicant: CANON KABUSHIKI KAISHA, Tokyo (JP)

(72) Inventor: Kazuki Ohshitanai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/225,550

(22) Filed: Mar. 26, 2014

(65) Prior Publication Data

US 2014/0320720 A1    Oct. 30, 2014

(30) Foreign Application Priority Data

Apr. 24, 2013    (JP) .................................. 2013-091789

(51) Int. Cl.
*H04N 5/372* (2011.01)
*H04N 5/335* (2011.01)
*H04N 5/369* (2011.01)

(52) U.S. Cl.
CPC ........... *H04N 5/37213* (2013.01); *H04N 5/335* (2013.01); *H04N 5/369* (2013.01)

(58) Field of Classification Search
CPC .... H04N 5/37213; H04N 5/361; H04N 5/357
See application file for complete search history.

(56) References Cited

U.S. PATENT DOCUMENTS

| | | | | |
|---|---|---|---|---|
| 8,072,513 | B2 * | 12/2011 | Takenaka | H04N 5/361 348/243 |
| 8,179,461 | B2 * | 5/2012 | Suzuki | H04N 5/3572 250/208.1 |
| 2008/0273101 | A1 * | 11/2008 | Takenaka et al. | 348/243 |
| 2012/0194696 | A1 | 8/2012 | Ohshitanai et al. | |
| 2014/0036121 | A1 | 2/2014 | Minowa et al. | |

FOREIGN PATENT DOCUMENTS

JP    2012-191400 A    10/2012
WO    2011/055617 A1    5/2011

OTHER PUBLICATIONS

Oct. 27, 2014 extended European Search Report concerning corresponding European Patent Application No. 14160826.5.

* cited by examiner

*Primary Examiner* — Ahmed A Berhan
(74) *Attorney, Agent, or Firm* — Fitzpatrick, Cella, Harper & Scinto

(57) ABSTRACT

A solid-state image sensor has a pixel array and a processor configured to process a signal from the pixel array, the pixel array including a light-receiving pixel having first and second photoelectric converters and a light-shielded pixel having third and fourth photoelectric converters. The processor outputs (a) a pixel signal corresponding to charges of the first photoelectric converter, (b) an added pixel signal corresponding to a sum of charges of the first photoelectric converter and charges of the second photoelectric converter, and (c) an added reference signal corresponding to a sum of charges of the third photoelectric converter and charges of the fourth photoelectric converter, and does not output (d) a reference signal corresponding to charges of the third photoelectric converter and a reference signal corresponding to charges of the fourth photoelectric converter.

15 Claims, 5 Drawing Sheets

SOLID-STATE IMAGE SENSOR AND CAMERA

BACKGROUND OF THE INVENTION

1. Field of the Invention

The present invention relates to a solid-state image sensor and a camera.

2. Description of the Related Art

Japanese Patent Laid-Open No. 2012-191400 discloses an image sensor which includes pixels each having a pair of photodiodes and detects a focus by a pupil division method. The image sensor has a first readout mode and a second readout mode. In the first readout mode, the image sensor reads out added output signals from the pairs of photodiodes of all the pixels to record the image generated by imaging. In the second readout mode, the image sensor reads out added output signals from the pairs of photodiodes of all the pixels to display an image on a liquid crystal display device and also reads out an output signal (single output signal) from one of the photodiodes of each pixel to detect a focus. Note that Japanese Patent Laid-Open No. 2012-191400 gives no consideration to the readout of signals from light-shielded pixels for the detection of dark currents in the pixels.

In general, a solid-state image sensor has a light-shielded pixel area (optical black pixel area) in which light-shielded pixels (optical black pixels) for obtaining reference signals are arranged. The light-shielded pixel area is arranged adjacent to a light-receiving pixel area in which light-receiving pixels (effective pixels) for detecting the optical image formed on an image sensing surface are arranged. That is, the pixel array of the solid-state image sensor includes the light-receiving pixel area and the light-shielded pixel area. A one-frame signal output from the solid-state image sensor includes a signal in the light-shielded pixel area and a signal in the light-receiving pixel area.

When the solid-state image sensor designed to detect a focus by the pupil division method outputs a signal from one of a pair of photoelectric converters constituting each light-receiving pixel, outputting also a signal from one of a pair of photoelectric converts constituting each light-shielded pixel takes a long period of time to output all signals.

SUMMARY OF THE INVENTION

The present invention provides a technique effective in shortening the time required to output signals.

The present invention in its first aspect provides a solid-state image sensor comprising a pixel array and a processor configured to process a signal from the pixel array, the pixel array including a light-receiving pixel having a first photoelectric converter and a second photoelectric converter, and a light-shielded pixel having a third photoelectric converter and a fourth photoelectric converter, wherein in a signal output period during which signals corresponding to charges of the first photoelectric converter, the second photoelectric converter, the third photoelectric converter, and the fourth photoelectric converter are output, the processor outputs (a) a pixel signal corresponding to charges of the first photoelectric converter, (b) an added pixel signal corresponding to a sum of charges of the first photoelectric converter and charges of the second photoelectric converter, and (c) an added reference signal corresponding to a sum of charges of the third photoelectric converter and charges of the fourth photoelectric converter, and does not output (d) a reference signal corresponding to charges of the third photoelectric converter and a reference signal corresponding to charges of the fourth photoelectric converter.

The present invention in its second aspect provides a camera comprising: the solid-state image sensor defined as the first aspect; and a processor configured to process a signal output from the solid-state image sensor.

The present invention in its third aspect provides a solid-state image sensor comprising a pixel array and a processor configured to process a signal from the pixel array, the pixel array including a light-receiving pixel having a first photoelectric converter and a second photoelectric converter, and a light-shielded pixel having a third photoelectric converter and a fourth photoelectric converter, wherein in a signal output period during which signals corresponding to charges of the first photoelectric converter, the second photoelectric converter, the third photoelectric converter, and the fourth photoelectric converter are output, the processor outputs (a) a pixel signal corresponding to charges of the first photoelectric converter, (b) an added pixel signal obtained by adding a signal corresponding to charges of the first photoelectric converter and a signal corresponding to charges of the second photoelectric converter, and (c) an added reference signal obtained by adding a signal corresponding to charges of the third photoelectric converter and a signal corresponding to charges of the fourth photoelectric converter, and does not output (d) a reference signal corresponding to charges of the third photoelectric converter and a reference signal corresponding to charges of the fourth photoelectric converter.

The present invention in its forth aspect provides a camera comprising: the solid-state image sensor defined as the third aspect; and a processor configured to process a signal output from the solid-state image sensor.

Further features of the present invention will become apparent from the following description of exemplary embodiments with reference to the attached drawings.

DESCRIPTION OF THE EMBODIMENTS

The exemplary embodiments of the present invention will be described below with reference to the accompanying drawings.

Figure 1:
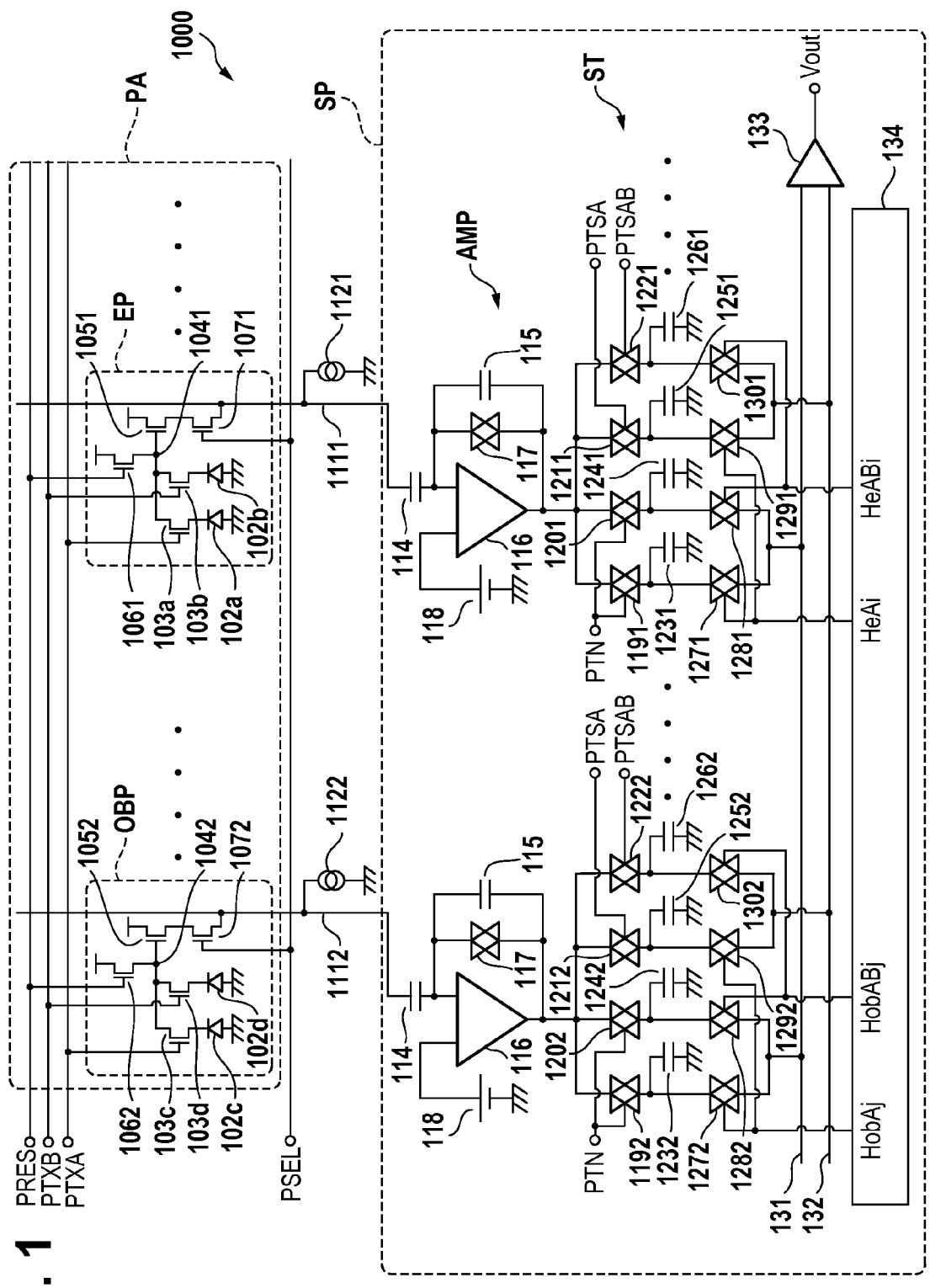
FIG. 1 is a circuit diagram showing the arrangement of a solid-state image sensor according to the first embodiment of the present invention.
Figure 2:
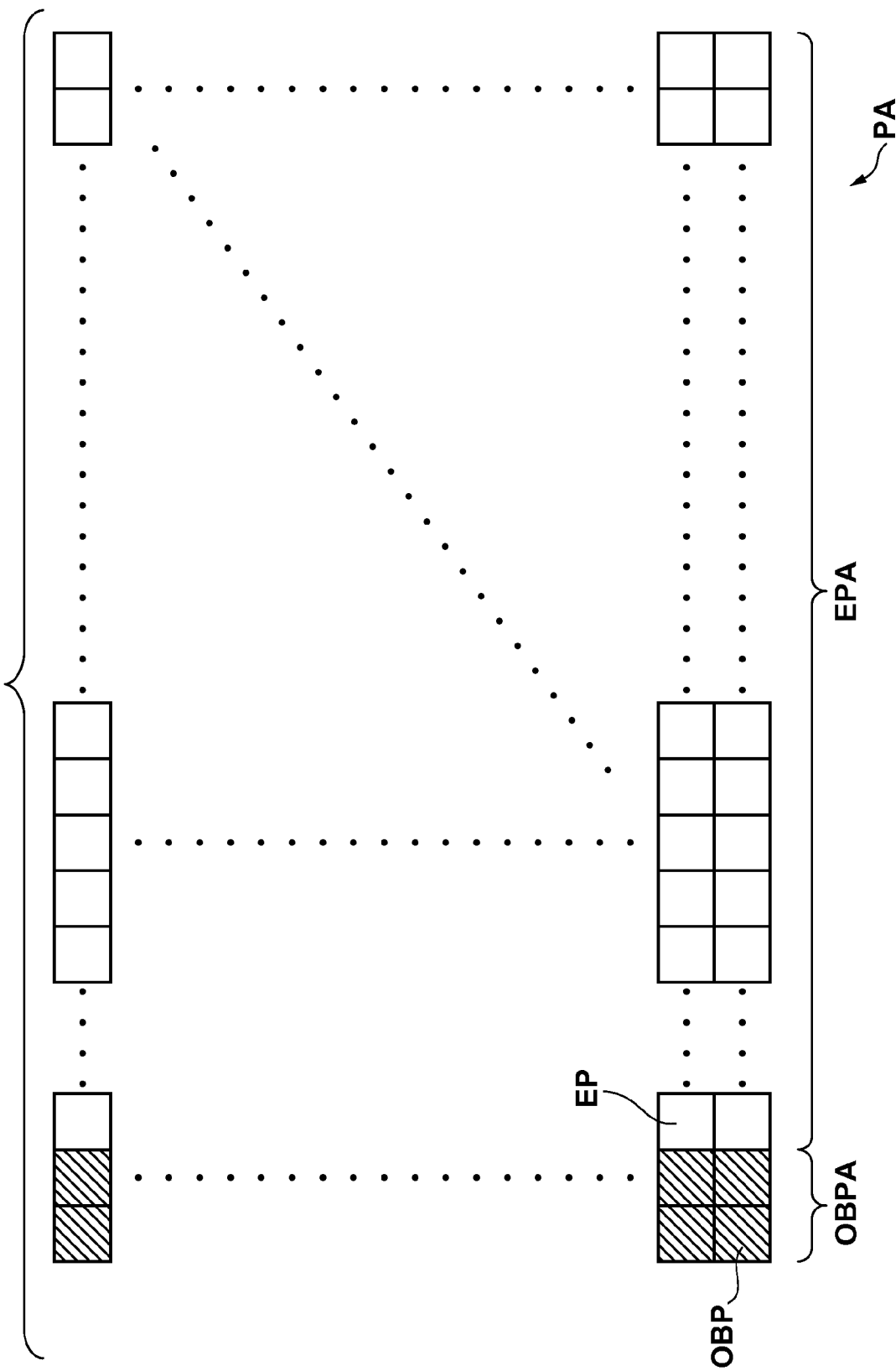
FIG. 2 is a view exemplarily showing the arrangement of a pixel array.

FIG. 1 shows the arrangement of a solid-state image sensor 1000 according to the first embodiment of the present invention. The solid-state image sensor 1000 includes a pixel array PA and a processor SP which processes signals from the pixel array PA. As exemplarily shown in FIG. 2, the pixel array PA includes a light-receiving pixel area EPA in which a plurality of light-receiving pixels (effective pixels) EP are arranged, and a light-shielded pixel area OBPA in which a plurality of light-shielded pixels (optical black pixels) OBP are arranged. The light-receiving pixels EP are both pixels for detecting the optical image formed, on the light-receiving pixel area EPA, by an imaging lens and pixels for detecting the defocus amount of the imaging lens by a phase difference detection method. The light-shielded pixel OBP is a pixel which is light-shielded and serves to generate a reference signal (optical black level). The plurality of light-receiving pixels EP are arranged in the light-receiving pixel area EPA so as to form a plurality of rows and a plurality of columns. The plurality of light-shielded pixels OBP are arranged in the light-shielded pixel area OBPA so as to form a plurality of rows and a plurality of columns. In addition, the solid-state image sensor 1000 includes a row selection portion (not shown) which selects a row in the pixel array PA.

FIG. 1 shows only one light-receiving pixel EP of the plurality of light-receiving pixels EP and only one light-shielded pixel OB of the plurality of light-shielded pixels OBP. The light-receiving pixel EP includes a first photoelectric converter 102a and a second photoelectric converter 102b. The light-receiving pixel EP can include a first floating diffusion (a floating diffusion will be written as an FD hereinafter) 1041, a first transfer portion 103a which transfers the charges of the first photoelectric converter 102a to the first FD 1041, and a second transfer portion 103b which transfers the charges of the second photoelectric converter 102b to the first FD 1041. The potential of the first FD 1041 is set to a potential corresponding to the amount of charges transferred to the first FD 1041.

The light-receiving pixel EP can include an amplifier portion 1051 which outputs a signal corresponding to the potential of the first FD 1041 to a column signal line 1111 and a reset portion 1061 which resets the potential of the first FD 1041. The amplifier portion 1051 constitutes a source follower circuit, together with a constant current source 1121 connected to the column signal line 1111. The light-receiving pixel EP may include a selection portion 1071 for setting the light-receiving pixel EP in a selected state. The light-receiving pixel EP may be controlled to a selected state or unselected state in accordance with the potential of the first FD 1041 instead of providing the selection portion 1071.

Although not shown, one microlens is provided for one light-receiving pixel EP including the first photoelectric converter 102a and the second photoelectric converter 102b. It is possible to obtain phase difference information representing the defocus amount of the imaging lens from the signal based on the charges accumulated in the first photoelectric converter 102a of each of the plurality of light-receiving pixels EP and the signal based on the charges accumulated in the second photoelectric converter 102b of each of the plurality of light-receiving pixels EP. It is possible to focus on the image sensing surface of the solid-state image sensor 1000 by driving the focusing lens of the imaging lens so as to make the defocus amount fall within an allowable range.

The light-shielded pixel OBP can have the same arrangement as that of the light-receiving pixel EP except that it is light-shielded. The light-shielded pixel OBP includes a third photoelectric converter 102c and a fourth photoelectric converter 102d. The light-shielded pixel OBP can also include a second FD 1042, a third transfer portion 103c which transfers the charges of the third photoelectric converter 102c to the second FD 1042, and a fourth transfer portion 103d which transfers the charges of the fourth photoelectric converter 102d to the second FD 1042. The potential of the second FD 1042 is set to a potential corresponding to the amount of charges transferred to the second FD 1042.

The light-shielded pixel OBP can also include an amplifier portion 1052 which outputs a signal corresponding to the potential of the second FD 1042 to a column signal line 1112 and a reset portion 1062 which resets the potential of the second FD 1042. The amplifier portion 1052 constitutes a source follower circuit, together with a constant current source 1122 connected to the column signal line 1112. The light-shielded pixel OBP may also include a selection portion 1072 for setting the light-shielded pixel OBP in a selected state. The light-shielded pixel OBP may be controlled to a selected state or unselected state in accordance with the potential of the second FD 1042 instead of providing the selection portion 1072.

The first transfer portion 103a of the light-receiving pixel EP and the third transfer portion 103c of the light-shielded pixel OBP perform charge transfer operation when a first transfer signal PTXA driven by the row selection portion becomes an active level. The second transfer portion 103b of the light-receiving pixel EP and the fourth transfer portion 103d of the light-shielded pixel OBP perform charge transfer operation when a first transfer signal PTXB driven by the row selection portion becomes an active level. The reset portions 1061 and 1062 reset the potentials of the FDs 1041 and 1042 to the reset potential when a reset signal PRES driven by the row selection portion becomes an active level. The selection portions 1071 and 1072 set the pixels to which the selection portions 1071 and 1072 belong in a selected state when a row selection signal PSEL driven by the row selection portion becomes an active level.

The processor SP can include column amplifiers AMP respectively provided for the column signal lines 1111 and 1112 and holding blocks ST respectively provided for the column signal lines 1111 and 1112. The processor SP can also include a column selection portion 134, an output amplifier 133, and horizontal signal lines 131 and 132 which transmit the signals held in the holding blocks ST to the output amplifier 133.

The column amplifier AMP provided for the column signal line 1111 amplifies the signal output from the light-receiving pixel EP to the column signal line 1111. Holding portions 1231, 1241, 1251, and 1261 of the holding block ST provided for the column signal line 1111 hold the amplified signal. The column amplifier AMP provided for the column signal line 1112 amplifies the signal output from the light-shielded pixel OBP to the column signal line 1112. Holding portions 1232, 1242, 1252, and 1262 of the holding block ST provided for the column signal line 1112 hold the amplified signal.

The column amplifier AMP includes an operational amplifier 116 having first and second input terminals and an output terminal, an input capacitor 114, a feedback capacitor 115, and a switch 117. One terminal of the input capacitor 114 is connected to the column signal line 1111 (1112), and the other terminal is connected to the first input terminal of the operational amplifier 116. The second input terminal of the operational amplifier 116 receives a reference voltage 118. The feedback capacitor 115 is connected between the first input terminal and output terminal of the operational amplifier 116. The switch 117 is connected between the first input terminal and output terminal of the operational amplifier 116. An amplifier control signal PC0R (see FIG. 3) controls the switch 117. While the switch 117 is on, the column amplifier AMP operates as a unity gain buffer. While the switch 117 is off, the column amplifier AMP operates as an inverting amplifier. The gain of the column amplifier AMP when it operates as an inverting amplifier is given as $-C0/Cf$ where C0 is the capacitance value of the input capacitor 114 and Cf is the capacitance value of the feedback capacitor 115.

The holding portion 1231 is the first noise level holding portion which holds a signal (to be referred to as an N signal hereinafter) corresponding to the noise level of the light-receiving pixel EP. The holding portion 1241 is the second noise level holding portion which holds a signal (N signal) corresponding to the noise level of the light-receiving pixel EP. A signal (N signal) corresponding to the noise level of the light-receiving pixel EP can be simultaneously written in the holding portions 1231 and 1241 via switches 1191 and 1201 controlled by a write signal PTN. The holding portion 1251 is the first holding portion which holds a signal (to be referred to as an A signal hereinafter) corresponding to the charges of the first photoelectric converter 102a of the light-receiving pixel EP. The holding portion 1261 is the second holding portion which holds a signal (to be referred to as an AB signal hereinafter) corresponding to the sum of the charges of the first photoelectric converter 102a of the light-receiving pixel EP and the charges of the second photoelectric converter 102b. A signal (A signal) corresponding to the charges of the first photoelectric converter 102a of the light-receiving pixel EP is written in the holding portion 1251 via a switch 1211 controlled by a write signal PTSA. A signal (AB signal) corresponding to the sum of the charges of the first photoelectric converter 102a of the light-receiving pixel EP and the charges of the second photoelectric converter 102b of the light-receiving pixel EP is written in the holding portion 1261 via a switch 1221 controlled by a write signal PTSAB.

The A signal includes a signal (N signal) corresponding to the noise level of the light-receiving pixel EP in addition to a signal corresponding to the charges of the first photoelectric converter 102a of the light-receiving pixel EP. The AB signal includes a signal (N signal) corresponding to the noise level of the light-receiving pixel EP in addition to a signal (A signal) corresponding to the charges of the first photoelectric converter 102a of the light-receiving pixel EP and a signal (to be referred to as a B signal hereinafter) corresponding to the charges of the second photoelectric converter 102b of the light-receiving pixel EP.

The signal (N signal) held by the holding portion 1231 is transferred to the horizontal signal line 131 via a switch 1271 controlled by a horizontal transfer signal HeAi driven by the column selection portion 134. The signal (A signal) held by the holding portion 1251 is transferred to the horizontal signal line 132 via a switch 1291 controlled by the horizontal transfer signal HeAi driven by the column selection portion 134. The suffix "i" of the horizontal transfer signal HeAi specifies one of a plurality of column signal lines 1111 for the light-receiving pixel area EPA of the pixel array PA. For example, a horizontal transfer signal for the column signal line 1111 of the first column of the light-receiving pixel area EPA is represented by HeA1, and a horizontal transfer signal for the column signal line 1111 of the nth column of the light-receiving pixel area EPA is represented by HeAn.

The signal (N signal) held by the holding portion 1241 is transferred to the horizontal signal line 131 via a switch 1281 controlled by a horizontal transfer signal HeABi driven by the column selection portion 134. The signal (AB signal) held by the holding portion 1261 is transferred to the horizontal signal line 132 via a switch 1301 controlled by the horizontal transfer signal HeABi driven by the column selection portion 134. The suffix "i" of the horizontal transfer signal HeABi specifies one of the plurality of column signal lines 1111 for the light-receiving pixel area EPA of the pixel array PA. For example, a horizontal transfer signal for the column signal line 1111 of the first column of the light-receiving pixel area EPA is represented by HeAB1, and a horizontal transfer signal for the column signal line 1111 of the nth column of the light-receiving pixel area EPA is represented by HeABn.

The output amplifier 133 outputs a signal corresponding to the difference between the signals transferred to the horizontal signal lines 131 and 132, more specifically, the signal obtained by amplifying the difference, from an output terminal Vout. When, for example, the horizontal transfer signal HeAi is driven to an active level, the output amplifier 133 outputs the pixel signal (to be referred to as the A' signal hereinafter) obtained by amplifying the difference between the A signal and the N signal (that is, the signal obtained by subtracting the N signal from the A signal) from the output terminal Vout. When the horizontal transfer signal HeABi is driven to an active level, the output amplifier 133 outputs the added pixel signal (to be referred to as the AB' signal hereinafter) obtained by amplifying the difference between the AB signal and the N signal (that is, the signal obtained by subtracting the N signal from the AB signal) from the output terminal Vout.

The column amplifier AMP provided for the column signal line 1112 amplifies the signal output from the light-shielded pixel OBP to the column signal line 1112. The holding portions 1232, 1242, 1252, and 1262 of a holding block ST provided for the column signal line 1112 hold the amplified signal. In this case, the holding portion 1232 is the third noise level holding portion which holds a signal (to be referred to as an N signal hereinafter) corresponding to the noise level of the light-shielded pixel OBP. The holding portion 1242 is the fourth noise level holding portion which holds a signal (N signal) corresponding to the noise level of the light-shielded pixel OBP. A signal (N signal) corresponding to the noise level of the light-shielded pixel OBP can be simultaneously written in the holding portions 1232 and 1242 via switches 1192 and 1202 controlled by the write signal PTN. The holding portion 1252 is the third holding portion which holds a signal (to be referred to as an OBA signal hereinafter) corresponding to the charges of the third photoelectric converter 102c of the light-shielded pixel OBP. The holding portion 1262 is the fourth holding portion which holds a signal (to be referred to as an OBAB signal hereinafter) corresponding to the sum of the charges of the third photoelectric converter 102c of the light-shielded pixel OBP and the charges of the fourth photoelectric converter 102d. A signal (OBA signal) corresponding to the charges of the third photoelectric converter 102c of the light-shielded pixel OBP is written in the holding portion 1252 via a switch 1212 controlled by the write signal PTSA. A signal (OBAB signal) corresponding to the sum of the charges of the third photoelectric converter 102c of the light-shielded pixel OBP and the charges of the fourth photoelectric converter 102d of the light-shielded pixel OBP is written in the holding portion 1262 via a switch 1222 controlled by the write signal PTSAB.

The OBA signal includes a signal (N signal) corresponding to the noise level of the light-shielded pixel OBP in addition to a signal corresponding to the charges of the third photoelectric converter 102c of the light-shielded pixel OBP. The OBAB signal includes a signal (N signal) corresponding to the noise level of the light-shielded pixel OBP in addition to a signal (OBA signal) corresponding to the charges of the third photoelectric converter 102c of the light-shielded pixel OBP and a signal (to be referred to as an OBB signal hereinafter) corresponding to the charges of the fourth photoelectric converter 102d of the light-shielded pixel OBP.

In the first embodiment, the solid-state image sensor 1000 has a non-output mode of not outputting a signal corresponding to the signal (OBA signal) held by the holding portion 1252 (more specifically, the signal obtained by amplifying the difference between the OBA signal and the N signal) from the output amplifier 133. In this non-output mode, it is possible to shorten the time required to output a signal by not outputting a signal corresponding to the OBA signal from the output amplifier 133. In this case, signals for focus detection, that is, signals from a pair of photoelectric converters constituting a pixel, suffice as long as it is possible to detect a focus based on them. There is no need to correct these signals by using reference signals from the light-shielded pixels OBP. Alternatively, a signal for focus detection may be corrected by using the OBAB signal.

Note, however, that the solid-state image sensor 1000 may have an output mode of outputting a signal corresponding to the signal (OBA signal) held by the holding portion 1252 (more specifically, the signal obtained by amplifying the difference between the OBA signal and the N signal) from the output amplifier 133. In the output mode, the signal (N signal) held by the holding portion 1232 is transferred to the horizontal signal line 131 via a switch 1272 controlled by a horizontal transfer signal HobAj driven by the column selection portion 134. In the output mode, the signal (OBA signal) held by the holding portion 1252 is transferred to the horizontal signal line 132 via a switch 1292 controlled by the horizontal transfer signal HobAj driven by the column selection portion 134. The suffix "j" of the horizontal transfer signal HobAj specifies one of the plurality of column signal lines 1112 for a light-shielded pixel area OBPA of the pixel array PA. For example, a horizontal transfer signal for the column signal line 1112 of the first column of the light-shielded pixel area OBPA is represented by HobA1, and a horizontal transfer signal for the column signal line 1112 of the nth column of the light-shielded pixel area OBPA is represented by HobAn.

The signal (N signal) held by the holding portion 1242 is transferred to the horizontal signal line 131 via a switch 1282 controlled by a horizontal transfer signal HobABj driven by the column selection portion 134. The signal (OBAB signal) held by the holding portion 1262 is transferred to the horizontal signal line 132 via a switch 1302 controlled by the horizontal transfer signal HobABj driven by the column selection portion 134. The suffix "j" of the horizontal transfer signal HobABj specifies one of the plurality of column signal lines 1112 for the light-receiving pixel area EPA of the pixel array PA. For example, a horizontal transfer signal for the column signal line 1112 of the first column of the light-receiving pixel area EPA is represented by HobAB1, and a horizontal transfer signal for the column signal line 1112 of the nth column of the light-receiving pixel area EPA is represented by HobABn.

As described above, the output amplifier 133 outputs a signal corresponding to the difference between the signals transferred to the horizontal signal lines 131 and 132, more specifically, a signal Vout obtained by amplifying the difference. For example, when a horizontal transfer signal HobABi is driven to an active level, the output amplifier 133 outputs an added reference signal (to be referred to as an OBAB' signal hereinafter) obtained by amplifying the difference between the OBAB signal and the N signal (that is, a signal obtained by removing the N signal from the OBAB signal) from the output terminal Vout.

A processor which processes the signal output from the solid-state image sensor 1000 can obtain a corrected signal (to be referred to as an AB" signal hereinafter) by correcting the AB' signal based on the reference signal generated based on the OBAB' signal. In addition, the processor can obtain a signal (to be referred to as a B' signal hereinafter) corresponding to the charges of the second photoelectric converter 102b by computing the difference between the AB' signal and the A' signal. The processor can compute the defocus amount of the imaging lens based on the A' signal and a B' signal. In this case, although the A' signal and the B' signal are not signals corrected based on signals from the light-shielded pixels OBP, it suffices to know the correlation between the A' signal and the B' signal in order to detect a defocus amount. Alternatively, it is possible to use these signals upon correcting them by using the OBAB' signal.

Figure 3:
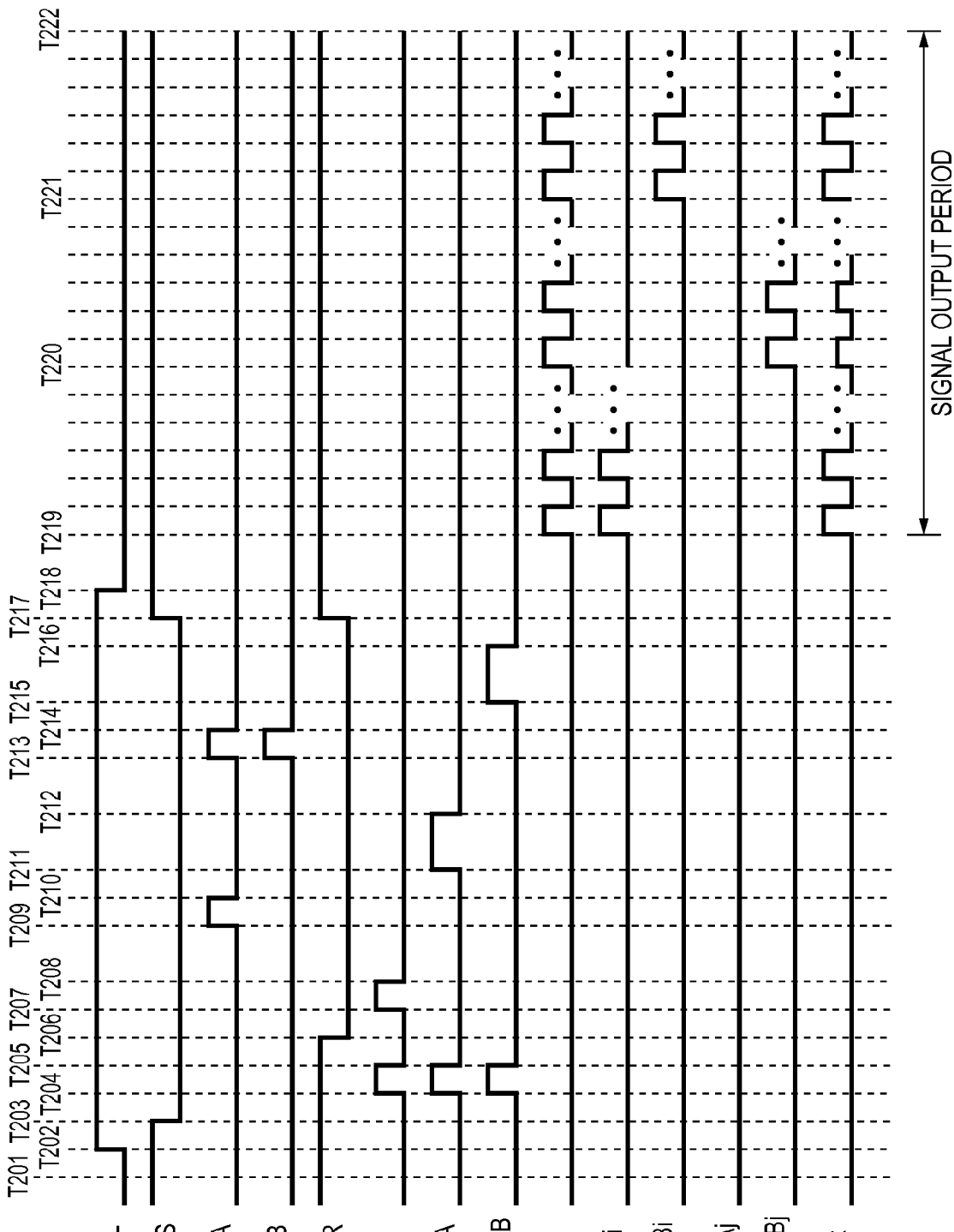
FIG. 3 is a timing chart for exemplarily explaining the operation of the solid-state image sensor in a non-output mode.

The operation of the solid-state image sensor 1000 in the non-output mode will be exemplarily described below with reference to FIG. 3. Referring to FIG. 3, a PH signal is a clock signal to be supplied to the column selection portion 134. An HeAi signal, HeABi signal, HobAi signal, and HobABi signal are those which become an active level (high level) when the corresponding columns are to be selected. For the sake of descriptive convenience, FIG. 3 shows the HeAi signal as the OR of HeA1, HeA2, . . . . Likewise, FIG. 3 shows the HeABi signal as the OR of HeAB1, HeAB2, . . . , and the HobABi signal as the OR of HobAB1, HobAB2, . . . .

At a timing T201, the first photoelectric converter 102a and second photoelectric converter 102b of the light-receiving pixel EP accumulate charges generated by photoelectric conversion, and the third photoelectric converter 102c and fourth photoelectric converter 102d of the light-shielded pixel OBP accumulate charges as noise components. At the timing T201, transfer portions 103a, 103b, 103c, and 103d are in an OFF state, reset portions 1061 and 1062 are in an ON state, and the FDs 1041 and 1042 are reset at the reset potential. In addition, at the timing T201, a selection portion 107 is in an OFF state. Furthermore, at the timing T201, the amplifier control signal PC0R is at high level, and the column amplifier AMP is operating as a unity gain buffer. In this state, when the reference voltage 118 is set at VC0R, the potentials of the first input terminal, second input terminal, and output terminal of the operational amplifier 116 of the column amplifier AMP are set at VC0R. In addition, at the timing T201, the switches 1191, 1201, 1211, 1221, 1192, 1202, 1212, and 1222 are in an OFF state.

At a timing T202, the row selection signal PSEL for a row to be selected is driven to high level to turn on the selection portions 1071 and 1072. This selects the light-receiving pixel EP and the light-shielded pixel OBP on a row to be selected. More specifically, the amplifier portion 1051 and column signal line 1111 of the light-receiving pixel EP on the row to be selected are connected to each other, and the amplifier portion 1052 and column signal line 1112 of the light-shielded pixel OBP on the row to be selected are connected to each other.

At a timing T203, the reset signal PRES for the selected row is driven to high level to turn off the reset portion 1061 of the light-receiving pixel EP on the selected row and the reset portion 1062 of the light-shielded pixel OBP on the selected row. This sets the first FD 1041 of the light-receiving pixel EP on the selected row and the second FD 1042 of the light-shielded pixel OBP on the selected row in a floating state.

In the interval between timings T204 and T205, write signals PTN, PTSA, and PTSAB are driven to high level to turn on the switches 1191, 1201, 1211, 1221, 1192, 1202, 1212, and 1222. This resets the holding portions 1231, 1241, 1251, 1261, 1232, 1242, 1252, and 1262. More specifically, an output voltage (VC0R) from the column amplifiers AMP is written in the holding portions 1231, 1241, 1251, 1261, 1232, 1242, 1252, and 1262.

At a timing T206, the amplifier control signal PC0R is driven to low level to turn on the switch 117. This makes the column amplifier AMP function as an inverting amplifier.

In the interval between timings T207 and T208, the write signal PTN is set at high level to turn on the switches 1191, 1211, 1192, and 1212. With this operation, the N signals are written in the holding portions 1231, 1251, 1232, and 1252.

In the interval between timings T209 and T210, the first transfer signal PTXA is driven to high level to transfer the charges of the first photoelectric converter 102a to the first FD 1041 and to transfer the charges of the third photoelectric converter 102c to the second FD 1042. With this operation, a signal corresponding to a change in the potential of the first FD 1041 is output to the column signal line 1111, and a signal corresponding to a change in the potential of the second FD 1042 is output to the column signal line 1112. The A signal appears at the output of the column amplifier AMP provided for the column signal line 1111, and the OBA signal appears at the output of the column amplifier AMP provided for the column signal line 1112.

In the interval between timings T211 and T212, the write signal PTSA is driven to high level to turn on the switches 1211 and 1212. With this operation, the A signal is written in the first holding portion 1251, and the OBA signal is written in the third holding portion 1252.

In the interval between timings T213 and T214, the first transfer signal PTXA and the second transfer signal PTXB are driven to high level to turn on both the first transfer portion 103a and the second transfer portion 103b. This transfers the charges accumulated in the first photoelectric converter 102a to the first FD 1041 and also transfers the charges accumulated in the second photoelectric converter 102b to the first FD 1041. That is, the first FD 1041 adds the charges of the first photoelectric converter 102a to the charges of the second photoelectric converter 102b. In addition, in the interval between the timings T213 and T214, both the third transfer portion 103c and the fourth transfer portion 103d are turned on. This transfers the charges accumulated in the third photoelectric converter 102c to the second FD 1042 and also transfers the charges accumulated in the fourth photoelectric converter 102d to the second FD 1042. That is, the second FD 1042 adds the charges of the third photoelectric converter 102c to the charges of the fourth photoelectric converter 102d. In this case, the timing T214 is the end timing of charge accumulating operation in the light-receiving pixel EP and the light-shielded pixel OBP on the selected row.

In the interval between timings T215 and T216, the write signal PTSAB is driven to high level to turn on the switches 1221 and 1222. With this operation, the AB signal is written in the second holding portion 1261, and the OBAB signal is written in the fourth holding portion 1262.

At a timing T217, the reset signal PRES is driven to high level to turn on the reset portions 1061 and 1062 and reset the first FD 1041 and the second FD 1042 to the reset potential. In addition, at the timing T217, the amplifier control signal PC0R is driven to high level to turn on the switch 117 of the column amplifier AMP and set the column amplifier AMP in a unity gain buffer state.

At a timing T218, the row selection signal PSEL for the selected row is driven to low level to set the row in an unselected state.

The interval between timings T219 and T222 is a signal output period. In the signal output period, this image sensor outputs signals corresponding to the charges of the first photoelectric converter 102a and second photoelectric converter 102b of the light-receiving pixel EP on the selected row and the charges of the third photoelectric converter 102c and fourth photoelectric converter 102d of the light-shielded pixel OBP on the selected row.

In the interval between the timings T219 and T220, the column selection portion 134 performs column selecting operation concerning the light-receiving pixel area EPA. The column selection portion 134 sequentially drives HeA1, HeA2, . . . to high level. This transfers the A signal held by the holding portion 1251 to the horizontal signal line 132 via the switch 1291, and transfers the N signal held by the holding portion 1231 to the horizontal signal line 131 via the switch 1271. The output amplifier 133 outputs the signal (A' signal) obtained by amplifying the difference between the A signal and the N signal (that is, the signal obtained by removing the N signal from the A signal) from the output terminal Vout.

In the interval between the timings T220 and T221, the column selection portion 134 performs column selecting operation concerning the light-shielded pixel area OBPA. The column selection portion 134 sequentially drives HobAB1, HobAB2, . . . to high level. This transfers the OBAB signal held by the holding portion 1262 to the horizontal signal line 132 via the switch 1302, and transfers the N signal held by the holding portion 1242 to the horizontal signal line 131 via the switch 1282. The output amplifier 133 outputs the signal (OBAB' signal) obtained by amplifying the difference between the OBAB signal and the N signal (that is, the signal obtained by removing the N signal from the OBAB signal) from the output terminal Vout.

In the interval between the timings T221 and T222, the column selection portion 134 performs column selecting operation concerning the light-receiving pixel area EPA. The column selection portion 134 sequentially drives HeAB1, HeAB2, . . . to high level. This transfers the AB signal held by the holding portion 1261 to the horizontal signal line 132 via the switch 1301, and transfers the N signal held by the holding portion 1241 to the horizontal signal line 131 via the switch 1281. The output amplifier 133 outputs the signal (AB' signal) obtained by amplifying the difference between the AB signal and the N signal (that is, the signal obtained by removing the N signal from the AB signal) from the output terminal Vout.

In this case, in a signal output period in the non-output mode, the column selection portion 134 does not drive the HobAj signal to high level (active level). That is, in the signal output period in the non-output mode, the column selection portion 134 inhibits the signal (OBA signal) held by the holding portion 1252 from being transferred to the output amplifier 133. That is, in the non-output mode, the processor SP does not output any reference signal (OBA signal) corresponding to the charges of the third photoelectric converter 102c of the light-shielded pixel OBP. In addition, in the non-output mode, the processor SP does not output any reference signal corresponding to the charges of the fourth photoelectric converter 102d of the light-shielded pixel OBP.

The above embodiment is configured to output analog signals. However, the solid-state image sensor 1000 may incorporate an A/D converter to output digital signals. For example, the A/D converter can be arranged to A/D-convert an output signal from the column amplifier AMP. The holding block ST can be configured to hold an A/D-converted digital signal.

The second embodiment of the present invention will be described below with reference to FIG. 4. In the first embodiment, the FD adds the charges of the first photoelectric converter to the charges of the second photoelectric converter to add a signal from the photoelectric converter to a signal from the second photoelectric converter. In the second embodiment, a column amplifier AMP adds a signal from the first photoelectric converter to a signal from the second photoelectric converter. Note that particulars that are not described in the second embodiment can comply with the first embodiment.

Figure 4:
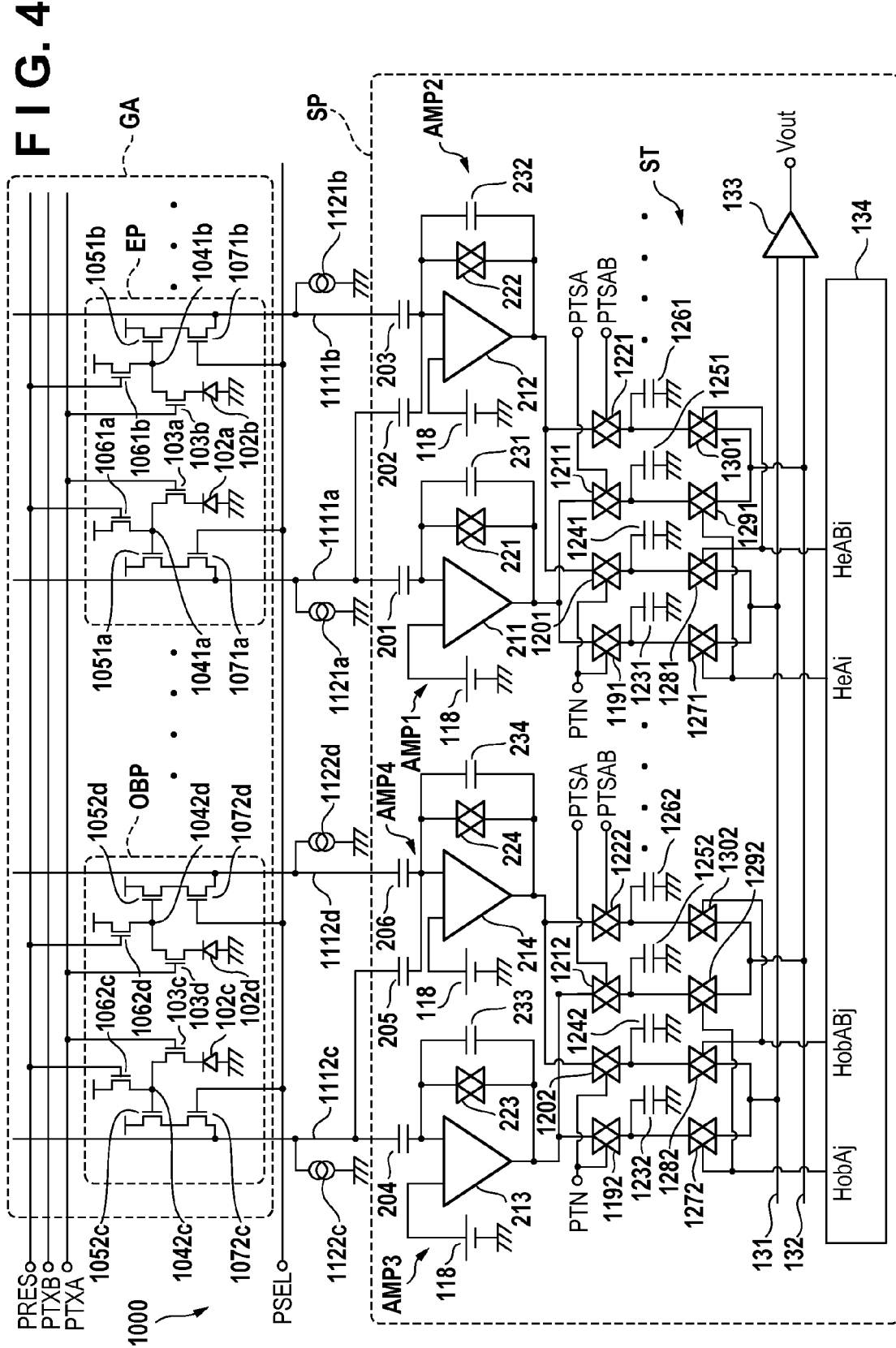
FIG. 4 is a circuit diagram showing the arrangement of a solid-state image sensor according to the second embodiment of the present invention.

FIG. 4 shows only one light-receiving pixel EP of a plurality of light-receiving pixels EP, and also shows only one light-shielded pixel OB of a plurality of light-shielded pixels OBP. The light-receiving pixel EP includes a first photoelectric converter 102a and a second photoelectric converter 102b. The light-receiving pixel EP can include a first FD 1041a, a second FD 1041b, a first transfer portion 103a which transfers the charges of the first photoelectric converter 102a to the first FD 1041a, and a second transfer portion 103b which transfers the charges of the second photoelectric converter 102b to the second FD 1041b. The potential of the first FD 1041a is set to a potential corresponding to the amount of charges transferred from the first FD 1041a. The potential of the second FD 1041b is set to a potential corresponding to the amount of charges transferred from the second FD 1041b.

The light-receiving pixel EP can include amplifier portions 1051a and 1051b which output signals corresponding to the potentials of the FDs 1041a and 1041b to column signal lines 1111a and 1111b, and reset portions 1061a and 1061b which reset the potentials of the FDs 1041a and 1041b. The amplifier portions 1051a and 1051b constitute source follower circuits, together with constant current sources 1121a and 1121b connected to the column signal lines 1111a and 1111b. The light-receiving pixel EP can include selection portions 1071a and 1071b for setting the light-receiving pixel EP in a selected state. The light-receiving pixel EP may be controlled to a selected state or unselected state in accordance with the potentials of the FDs 1041a and 1041b instead of providing the selection portion 1071a.

Although not shown, one microlens is provided for one light-receiving pixel EP including the first photoelectric converter 102a and the second photoelectric converter 102b. It is possible to obtain phase difference information representing the defocus amount of the imaging lens from the signal based on the charges accumulated in the first photoelectric converter 102a of each of the plurality of light-receiving pixels EP and the signal based on the charges accumulated in the second photoelectric converter 102b of each of the plurality of light-receiving pixels EP. It is possible to focus on the image sensing surface of a solid-state image sensor 1000 by driving the focusing lens of the imaging lens so as to make the defocus amount fall within an allowable range.

The light-shielded pixel OBP can have the same arrangement as that of the light-receiving pixel EP except that it is light-shielded. The light-shielded pixel OBP includes a third photoelectric converter 102c and a fourth photoelectric converter 102d. The light-shielded pixel OBP can also include a third FD 1042c, a fourth FD 1042d, a third transfer portion 103c which transfers the charges of the third photoelectric converter 102c to the third FD 1042c, and a fourth transfer portion 103d which transfers the charges of the fourth photoelectric converter 102d to the fourth FD 1042d. The potential of the third FD 1042c is set to a potential corresponding to the amount of charges transferred to the third FD 1042c. The potential of the fourth FD 1042d is set to a potential corresponding to the amount of charges transferred to the fourth FD 1042d.

The light-shielded pixel OBP can also include amplifier portions 1052c and 1052d which output signals corresponding to the potentials of the FDs 1042c and 1042d to column signal lines 1112c and 1112d and reset portions 1062c and 1062d which reset the potentials of the FDs 1042c and 1042d. The amplifier portions 1052c and 1052d constitute source follower circuits, together with constant current sources 1122c and 1122d connected to the column signal line 1112c and 1112d. The light-shielded pixel OBP may also include selection portions 1072c and 1072d for setting the light-shielded pixel OBP in a selected state. The light-shielded pixel OBP may be controlled to a selected state or unselected state in accordance with the potentials of the FDs 1042c and 1042d instead of providing the selection portions 1072c and 1072d.

The first transfer portion 103a of the light-receiving pixel EP and the third transfer portion 103c of the light-shielded pixel OBP perform charge transfer operation when a first transfer signal PTXA driven by the row selection portion becomes an active level. The second transfer portion 103b of the light-receiving pixel EP and the fourth transfer portion 103d of the light-shielded pixel OBP perform charge transfer operation when a first transfer signal PTXB driven by the row selection portion becomes an active level. The reset portions 1061a, 1061b, 1062c, and 1062d reset the potentials of the FDs 1041a, 1041b, 1042c, and 1042d to the reset potential when a reset signal PRES driven by the row selection portion becomes an active level. The selection portions 1071a, 1071b, 1072c, and 1072d set the pixel to which the selection portions 1071a and 1071b belong and the pixel to which the selection portions 1072c and 1072d belong in a selected state when a row selection signal PSEL driven by the row selection portion becomes an active level.

The processor SP can include column amplifiers AMP1 to AMP4 and holding blocks ST. The processor SF can also include a column selection portion 134, an output amplifier 133, and horizontal signal lines 131 and 132 which transmit the signals held in the holding blocks ST to the output amplifier 133.

The column amplifiers AMP provided for the column signal lines 1111a and 1111b amplify the signals output from the light-receiving pixel EP to the column signal lines 1111a and 1111b. Holding portions 1231, 1241, 1251, and 1261 of the holding blocks ST provided for the column signal lines 1111a and 1111b hold the amplified signals.

The column amplifier AMP1 includes an operational amplifier 211 having first and second input terminals and an output terminal, an input capacitor 201, a feedback capacitor 231, and a switch 221. One terminal of the input capacitor 201 is connected to the column signal line 1111a, and the other terminal is connected to the first input terminal of the operational amplifier 211. The second input terminal of the operational amplifier 211 receives a reference voltage 118. The feedback capacitor 231 is connected between the first input terminal and output terminal of the operational amplifier 211. The switch 221 is connected between the first input terminal and output terminal of the operational amplifier 211. An amplifier control signal PC0R (see FIG. 3) controls the switch 221. While the switch 221 is on, the column amplifier AMP1 operates as a unity gain buffer. While the switch 221 is off, the column amplifier AMP1 operates as an inverting amplifier. The column amplifier AMP1 outputs a signal (A signal) corresponding to the charges of the first photoelectric converter 102a of the light-receiving pixel EP.

The column amplifier AMP2 includes an operational amplifier 212 having a first input terminal, a second input terminal, and an output terminal, a first input capacitor 202, a second input capacitor 203, a feedback capacitor 232, and a switch 222. One terminal of the first input capacitor 202 is connected to the column signal line 1111a, and the other terminal is connected to the first input terminal of the operational amplifier 212. One terminal of the second input capacitor 203 is connected to the column signal line 1111b, and the other terminal is connected to the first input terminal of the operational amplifier 212. The second input terminal of the operational amplifier 212 receives the reference voltage 118. The feedback capacitor 232 is connected between the first input terminal and output terminal of the operational amplifier 212. The switch 222 is connected between the first input terminal and output terminal of the operational amplifier 212. An amplifier control signal PC0R (see FIG. 3) controls the switch 222. While the switch 222 is on, the column amplifier AMP2 operates as a unity gain buffer. While the switch 222 is off, the column amplifier AMP2 operates as an inverting amplifier. The column amplifier AMP2 outputs a signal (AB signal) corresponding to the sum of the charges of the first photoelectric converter 102a of the light-receiving pixel EP and the charges of the second photoelectric converter 102b.

The column amplifier AMP3 includes an operational amplifier 213 having a first input terminal, a second input terminal, and an output terminal, an input capacitor 204, a feedback capacitor 233, and a switch 223. One terminal of the input capacitor 204 is connected to the column signal line 1112c, and the other terminal is connected to the first input terminal of the operational amplifier 213. The second input terminal of the operational amplifier 213 receives the reference voltage 118. The feedback capacitor 233 is connected between the first input terminal and output terminal of the operational amplifier 213. The switch 223 is connected between the first input terminal and output terminal of the operational amplifier 213. The amplifier control signal PC0R (see FIG. 3) controls the switch 223. While the switch 223 is on, the column amplifier AMP3 operates as a unity gain buffer. While the switch 223 is off, the column amplifier AMP3 operates as an inverting amplifier. The column amplifier AMP3 outputs a signal (OBA signal) corresponding to the charges of the third photoelectric converter 102c of the light-shielded pixel OBP.

The column amplifier AMP4 includes an operational amplifier 214 having a first input terminal, a second input terminal, and an output terminal, a first input capacitor 205, a second input capacitor 206, a feedback capacitor 234, and a switch 224. One terminal of the first input capacitor 205 is connected to the column signal line 1112c, and the other terminal is connected to the first input terminal of the operational amplifier 214. One terminal of the second input capacitor 205 is connected to the column signal line 1112d, and the other terminal is connected to the first input terminal of the operational amplifier 214. The second input terminal of the operational amplifier 214 receives the reference voltage 118. The feedback capacitor 234 is connected between the first input terminal and output terminal of the operational amplifier 214. The switch 224 is connected between the first input terminal and output terminal of the operational amplifier 214. The amplifier control signal PC0R (see FIG. 3) controls the switch 224. While the switch 224 is on, the column amplifier AMP4 operates as a unity gain buffer. While the switch 224 is off, the column amplifier AMP4 operates as an inverting amplifier. The column amplifier AMP4 functions as an addition portion which outputs a signal (OBAB signal) corresponding to the sum of the charges of the third photoelectric converter 102c of the light-shielded pixel OBP and the charge of the fourth photoelectric converter 102d.

The holding portion 1231 is the first noise level holding portion which holds a signal (N signal) corresponding to the noise level of the light-receiving pixel EP. The holding portion 1241 is the second noise level holding portion which holds a signal (N signal) corresponding to the noise level of the light-receiving pixel EP. A signal (N signal) corresponding to the noise level of the light-receiving pixel EP can be simultaneously written in the holding portions 1231 and 1241 via switches 1191 and 1201 controlled by a write signal PTN. The holding portion 1251 is the first holding portion which holds a signal (A signal) corresponding to the charges of the first photoelectric converter 102a of the light-receiving pixel EP. The holding portion 1261 is the second holding portion which holds a signal (AB signal) corresponding to the sum of the charges of the first photoelectric converter 102a of the light-receiving pixel EP and the charges of the second photoelectric converter 102b. A signal (A signal) corresponding to the charges of the first photoelectric converter 102a of the light-receiving pixel EP is written in the holding portion 1251 via a switch 1211 controlled by a write signal PTSA. A signal (AB signal) corresponding to the sum of the charges of the first photoelectric converter 102a of the light-receiving pixel EP and the charges of the second photoelectric converter 102b of the light-receiving pixel EP is written in the holding portion 1261 via a switch 1221 controlled by a write signal PTSAB.

The operation of the solid-state image sensor 1000 according to the second embodiment in the non-output mode will be exemplarily described below with reference to FIG. 3.

At a timing T201, the first photoelectric converter 102a and second photoelectric converter 102b of the light-receiving pixel EP accumulate charges generated by photoelectric conversion, and the third photoelectric converter 102c and fourth photoelectric converter 102d of the light-shielded pixel OBP accumulate charges as noise components. At the timing T201, the transfer portions 103a, 103b, 103c, and 103d are in an OFF state, reset portions 1061 and 1062 are in an ON state, and FDs 1041 and 1042 are reset at the reset potential. In addition, at the timing T201, a selection portion 107 is in an OFF state. Furthermore, at the timing T201, the amplifier control signal PC0R is at high level, and the column amplifier AMP is operating as a unity gain buffer. In this state, when the reference voltage 118 is set at VC0R, the potentials of the first input terminal, second input terminal, and output terminal of an operational amplifier 116 of the column amplifier AMP are set at VC0R. In addition, at the timing T201, the switches 1191, 1201, 1211, and 1221 and switches 1192, 1202, 1212, and 1222 are in an OFF state.

At a timing T202, the row selection signal PSEL for a row to be selected is driven to high level to turn on the selection portions 1071a, 1071b, 1072c, and 1072d. This selects the light-receiving pixel EP and the light-shielded pixel OBP on a row to be selected. More specifically, the amplifier portion 1051a and column signal line 1111a of the light-receiving pixel EP on the row to be selected are connected to each other, and the amplifier portion 1051b and column signal line 1111b of the light-receiving pixel EP on the row to be selected are connected to each other. In addition, the amplifier portion 1052c and column signal line 1112c of the light-shielded pixel OBP on the row to be selected are connected to each other, and the amplifier portion 1052d and column signal line 1112d of the light-shielded pixel OBP on the row to be selected are connected to each other.

At a timing T203, a reset signal PRES for the selected row is driven to high level to turn off the reset portions 1061a and 1061b of the light-receiving pixel EP on the selected row and turn off the reset portions 1062c and 1062d of the light-shielded pixel OBP on the selected row. This sets the FDs 1041a and 1041b of the light-receiving pixel EP on the selected row and the FDs 1042c and 1042d of the light-shielded pixel OBP on the selected row in a floating state.

In the interval between timings T204 and T205, write signals PTN, PTSA, and PTSAB are driven to high level to turn on the switches 1191, 1201, 1211, 1221, 1192, 1202, 1212, and 1222. This resets the holding portions 1231, 1241, 1251,

1261, 1232, 1242, 1252, and 1262. More specifically, an output voltage (VC0R) from the column amplifiers AMP is written in the holding portions 1231, 1241, 1251, 1261, 1232, 1242, 1252, and 1262.

At a timing T206, the amplifier control signal PC0R is driven to low level to turn on the switch 117. This makes the column amplifier AMP function as an inverting amplifier.

In the interval between timings T207 and T208, the write signal PTN is set at high level to turn on the switches 1191, 1211, 1192, and 1212. With this operation, the N signal is written in the holding portions 1231, 1251, 1232, and 1252.

In the interval between timings T209 and T210, the first transfer signal PTXA is driven to high level to transfer the charges of the first photoelectric converter 102a to the first FD 1041a and to transfer the charges of the third photoelectric converter 102c to the second FD 1042c. With this operation, a signal corresponding to a change in the potential of the first FD 1041a is output to the column signal line 1111a, and a signal corresponding to a change in the potential of the second FD 1042c is output to the column signal line 1112c. The A signal appears at the output of the amplifier (the output of the operational amplifier 211) provided for the column signal line 1111a, and the OBA signal appears at the output of the amplifier (the output of the operational amplifier 213) provided for the column signal line 1112c.

In the interval between timings T211 and T212, the write signal PTSA is driven to high level to turn on the switches 1211 and 1212. With this operation, the A signal is written in the first holding portion 1251, and the OBA signal is written in the third holding portion 1252.

In the interval between timings T213 and T214, the first transfer signal PTXA and the second transfer signal PTXB are driven to high level to turn on both the first transfer portion 103a and the second transfer portion 103b. This transfers the charges accumulated in the first photoelectric converter 102a to the first FD 1041a and also transfers the charges accumulated in the second photoelectric converter 102b to the second FD 1041b. At this time, the column amplifier AMP2 adds the signal output from the column signal line 1111a and the signal output from the column signal line 1111b, and outputs the AB signal. In addition, in the interval between the timings T213 and T214, both the third transfer portion 103c and the fourth transfer portion 103d are turned on. This transfers the charges accumulated in the third photoelectric converter 102c to third FD 1041c and also transfers the charges accumulated in the fourth photoelectric converter 102d to the fourth FD 1041d. At this time, the column amplifier AMP4 adds the signal output from the column signal line 1112c and the signal output from the column signal line 1112d, and outputs the OBAB signal. In this case, the timing T214 is the end timing of charge accumulating operation in the light-receiving pixel EP and the light-shielded pixel OBP on the selected row.

In the interval between timings T215 and T216, the write signal PTSAB is driven to high level to turn on the switches 1221 and 1222. With this operation, the AB signal is written in the second holding portion 1261, and the OBAB signal is written in the fourth holding portion 1262.

At a timing T217, the reset signal PRES is driven to high level to turn on the reset portions 1061a, 1061b, 1062c, and 1062d and reset the FDs 1041a, 1041b, 1042c, and 1042d to the reset potential. In addition, at the timing T217, the amplifier control signal PC0R is driven to high level to turn on the switches 221, 222, 223, and 224 of the column amplifiers AMP and set the column amplifiers AMP in a unity gain buffer state.

At a timing T218, the row selection signal PSEL for the selected row is driven to low level to set the row in an unselected state.

The interval between timings T219 and T222 is a signal output period. In the signal output period, this image sensor outputs signals corresponding to the charges of the first photoelectric converter 102a and second photoelectric converter 102b of the light-receiving pixel EP on the selected row and the charges of the third photoelectric converter 102c and fourth photoelectric converter 102d of the light-shielded pixel OBP on the selected row.

In the interval between the timings T219 and T220, the column selection portion 134 performs column selecting operation concerning the light-receiving pixel area EPA. The column selection portion 134 sequentially drives HeA1, HeA2, . . . to high level. This transfers the A signal held by the holding portion 1251 to the horizontal signal line 132 via the switch 1291, and transfers the N signal held by the holding portion 1231 to the horizontal signal line 131 via the switch 1271. The output amplifier 133 outputs the signal (A' signal) obtained by amplifying the difference between the A signal and the N signal (that is, the signal obtained by removing the N signal from the A signal) from the output terminal Vout.

In the interval between the timings T220 and T221, the column selection portion 134 performs column selecting operation concerning the light-shielded pixel area OBPA. The column selection portion 134 sequentially drives HobAB1, HobAB2, . . . to high level. This transfers the OBAB signal held by the holding portion 1262 to the horizontal signal line 132 via the switch 1302, and transfers the N signal held by the holding portion 1242 to the horizontal signal line 131 via the switch 1282. The output amplifier 133 outputs the signal (OBAB' signal) obtained by amplifying the difference between the OBAB signal and the N signal (that is, the signal obtained by removing the N signal from the OBAB signal) from the output terminal Vout.

In the interval between the timings T221 and T222, the column selection portion 134 performs column selecting operation concerning the light-receiving pixel area EPA. The column selection portion 134 sequentially drives HeAB1, HeAB2, . . . to high level. This transfers the AB signal held by the holding portion 1261 to the horizontal signal line 132 via the switch 1301, and transfers the N signal held by the holding portion 1241 to the horizontal signal line 131 via the switch 1281. The output amplifier 133 outputs the signal (AB' signal) obtained by amplifying the difference between the AB signal and the N signal (that is, the signal obtained by removing the N signal from the AB signal) from the output terminal Vout.

Figure 5:
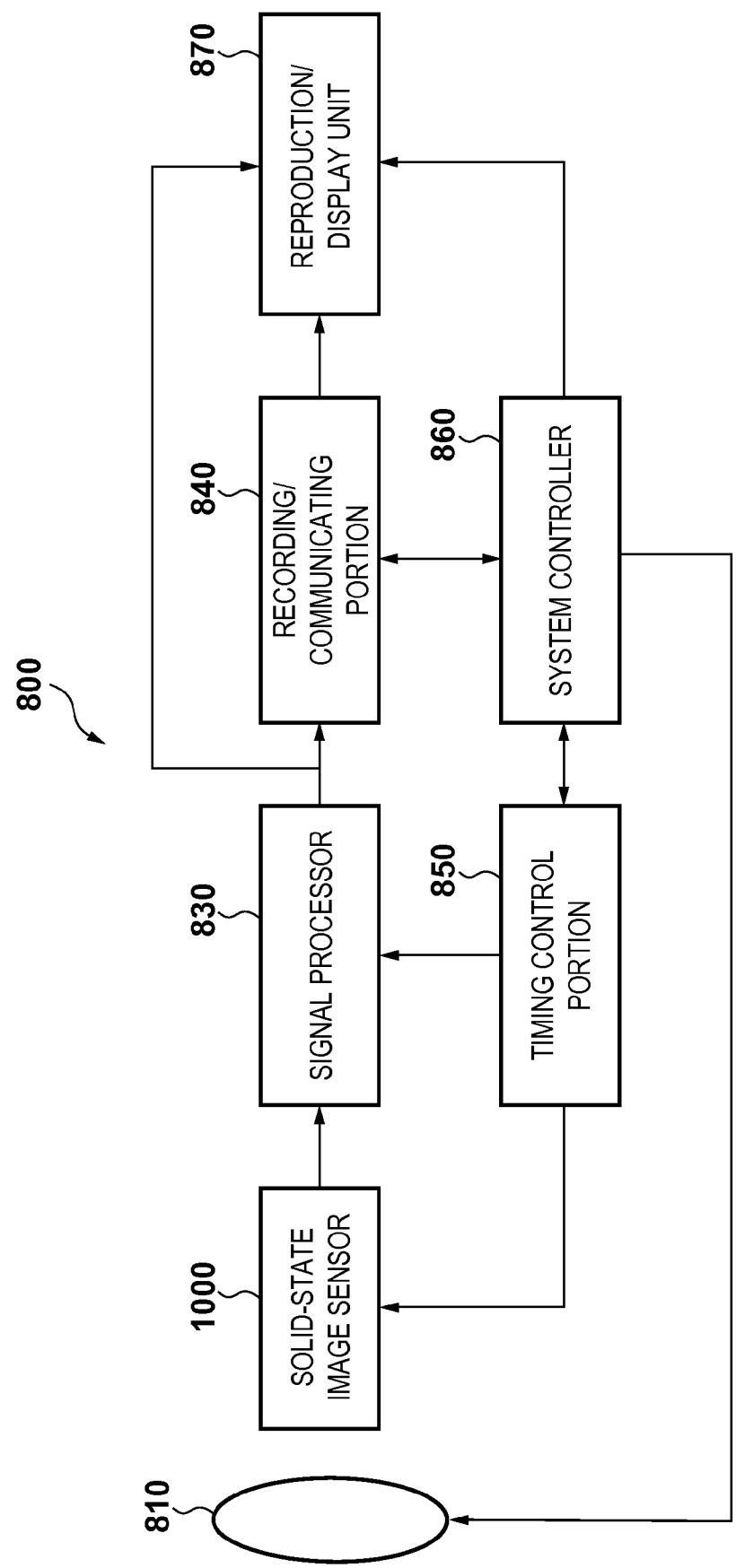
FIG. 5 is a block diagram showing the arrangement of a camera according to one embodiment of the present invention.

A camera 800 according to one embodiment of the present invention will be described below with reference to FIG. 5. The concept of the camera includes not only an apparatus mainly designed to perform imaging but also an apparatus including an imaging function as an auxiliary function (for example, a personal computer or a portable terminal). The camera includes a solid-state image sensor according to the present invention exemplified as the above embodiment and a processor which processes the signal (image) output from the solid-state image sensor. The processor can includes, for example, an A/D converter and a processor which processes the digital data output from the A/D converter.

The camera 800 includes, for example, an optical system 810, a solid-state image sensor 1000, a signal processor 830, a recording/communicating portion 840, a timing control portion 850, a system controller 860, and a reproduction/display unit 870. The optical system 810 forms an image of an object on the pixel array of the solid-state image sensor 1000. The solid-state image sensor 1000 outputs an image by performing imaging operation based on a signal from the timing control portion 850. The image output from the solid-state image sensor 1000 is provided to the signal processor 830.

The signal processor 830 processes the visible light image and infrared image provided from the solid-state image sensor 1000 and provides the resultant data to the recording/communicating portion 840. If the resolution of the infrared image is insufficient, the signal processor 830 can increase the resolution of the infrared image by using the visible light image.

The recording/communicating portion 840 sends an image to the reproduction/display unit 870 to cause it to reproduce and display the image. The recording/communicating portion 840 and the signal processor 830 record images on a recording medium (not shown).

The timing control portion 850 controls the driving timings of the solid-state image sensor 1000 and signal processor 830 under the control of the system controller 860. The system controller 860 comprehensively controls the operation of the camera 800, and controls the optical system 810, the timing control portion 850, the recording/communicating portion 840, and the reproduction/display unit 870. The system controller 860 includes, for example, a storage device (not shown), and records programs required to control the operation of the imaging system and the like on the storage device. In addition, the system controller 860 sets a mode, for example, in accordance with operation by the user.

The settable modes can include a mode of combining a visible light image with an infrared image and causing the reproduction/display unit to display the resultant image and a mode of causing the reproduction/display unit to individually display a visible light image and an infrared image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-091789, filed Apr. 24, 2013, which is hereby incorporated by reference herein in its entirety.

What is claimed is:

1. A solid-state image sensor comprising:
    a pixel array including a light-receiving pixel having a first photoelectric converter, a second photoelectric converter and one microlens provided in common for both the first photoelectric converter and the second photoelectric converter, and a light-shielded pixel having a third photoelectric converter and a fourth photoelectric converter; and
    a processor configured to process a signal from the pixel array,
    wherein in a period, the processor holds (a) a first signal corresponding to charges of the first photoelectric converter, (b) a second signal corresponding to a sum of charges of the first photoelectric converter and charges of the second photoelectric converter, and (c) a third signal corresponding to a sum of charges of the third photoelectric converter and charges of the fourth photoelectric converter, and
    wherein the processor outputs (a) a signal associated with the first signal held in the period, (b) a signal associated with the second signal held in the period, and (c) a signal associated with the third signal held in the period, and the processor does not output (d) a signal corresponding to charges of the third photoelectric converter and a signal corresponding to charges of the fourth photoelectric converter.

2. The solid-state image sensor according to claim 1, wherein the processor includes a first holding portion configured to hold the first signal,
    a second holding portion configured to hold the second signal,
    a third holding portion configured to hold a signal corresponding to charges of the third photoelectric converter, and
    a fourth holding portion configured to hold the third signal, and
    wherein the processor outputs the signal associated with the first signal held by the first holding portion, outputs the signal associated with the second signal held by the second holding portion, and outputs the signal associated with the third signal held by the fourth holding portion.

3. The solid-state image sensor according to claim 2, wherein the processor further includes a first noise level holding portion and a second noise level holding portion, each holding a signal corresponding to a noise level of the light-receiving pixel,
    wherein the processor outputs, as the signal associated with the first signal, a signal corresponding to a difference between a signal held by the first holding portion and a signal held by the first noise level holding portion, and outputs, as the signal associated with the second signal, a signal corresponding to a difference between a signal held by the second holding portion and a signal held by the second noise level holding portion.

4. The solid-state image sensor according to claim 2, wherein the processor further includes a third noise level holding portion and a fourth noise level holding portion, each holding a signal corresponding to a noise level of the light-shielded pixel, and
    wherein the processor outputs, as the signal associated with the third signal, a signal corresponding to a difference between a signal held by the fourth holding portion and a signal held by the fourth noise level holding portion.

5. The solid-state image sensor according to claim 1, wherein the light-receiving pixel includes a first floating diffusion, a first transfer portion configured to transfer charges of the first photoelectric converter to the first floating diffusion, a second transfer portion configured to transfer charges of the second photoelectric converter to the first floating diffusion, and a first amplifier portion configured to output a signal corresponding a potential of the first floating diffusion, the first amplifier portion outputting a signal corresponding to a sum of charges of the first photoelectric converter and charges of the second photoelectric converter to generate the signal associated with the second signal, and
    the light-shielded pixel includes a second floating diffusion, a third transfer portion configured to transfer charges of the third photoelectric converter to the second floating diffusion, a fourth transfer portion configured to transfer charges of the fourth photoelectric converter to the second floating diffusion, and a second amplifier portion configured to output a signal corresponding to a potential of the second floating diffusion, the second amplifier portion outputting a signal corresponding to a sum of charges of the third photoelectric converter and charges of the fourth photoelectric converter to generate the signal associated with the third signal.

6. A camera comprising:
a solid-state image sensor comprising a pixel array including a light-receiving pixel having a first photoelectric converter, a second photoelectric converter and one microlens provided in common for both the first photoelectric converter and the second photoelectric converter, and a light-shielded pixel having a third photoelectric converter and a fourth photoelectric converter, and a processor configured to process a signal from the pixel array; and
a processing unit configured to perform a processing based on output from the solid-state image sensor,
wherein in a period, the processor holds (a) a first signal corresponding to charges of the first photoelectric converter, (b) a second signal corresponding to a sum of charges of the first photoelectric converter and charges of the second photoelectric converter, and (c) a third signal corresponding to a sum of charges of the third photoelectric converter and charges of the fourth photoelectric converter, and
wherein the processor outputs (a) a signal associated with the first signal held in the period, (b) a signal associated with the second signal held in the period, and (c) a signal associated with the third signal held in the period, and does not output (d) a signal corresponding to charges of the third photoelectric converter and a signal corresponding to charges of the fourth photoelectric converter.

7. The camera according to claim 6, wherein the processing includes
obtaining, for detecting defocus amount, a signal associated with the charges of the second photoelectric converter, based on (i) the signal output from the solid-state image sensor, which is associated with the first signal corresponding to the charges of the first photoelectric converter, and (ii) the signal output from the solid-state image sensor, which is associated with the second signal corresponding to a sum of charges of the first photoelectric converter and charges of the second photoelectric converter, and
correcting the signal which is associated with the second signal and output from the solid-state image sensor based on the signal which is associated with the third signal and output from the solid-state image sensor.

8. The camera according to claim 7, wherein the processing includes
obtaining, for detecting defocus amount, a signal associated with the charges of the second photoelectric converter, based on (i) the signal output from the solid-state image sensor, which is associated with the first signal corresponding to the charges of the first photoelectric converter, and (ii) the signal output from the solid-state image sensor, which is associated with the second signal obtained by adding the signal corresponding to charges of the first photoelectric converter and the signal corresponding to charges of the second photoelectric converter, and
correcting the signal which is associated with the second signal output from the solid-state image sensor based on the signal which is associated with the third signal and output from the solid-state image sensor.

9. A solid-state image sensor comprising:
a pixel array including a light-receiving pixel having a first photoelectric converter, a second photoelectric converter and one microlens provided in common for both the first photoelectric converter and the second photoelectric converter, and a light-shielded pixel having a third photoelectric converter and a fourth photoelectric converter; and
a processor configured to process a signal from the pixel array,
wherein in a period, the processor holds (a) a first signal corresponding to charges of the first photoelectric converter, (b) a second signal obtained by adding a signal corresponding to charges of the first photoelectric converter and a signal corresponding to charges of the second photoelectric converter, and (c) a third signal obtained by adding a signal corresponding to charges of the third photoelectric converter and a signal corresponding to charges of the fourth photoelectric converter, and
wherein the processor outputs (a) a signal associated with the first signal held in the period, (b) a signal associated with the second signal held in the period, and (c) a signal associated with the third signal held in the period, and the processor does not output (d) a signal corresponding to charges of the third photoelectric converter and a signal corresponding to charges of the fourth photoelectric converter.

10. The solid-state image sensor according to claim 9, wherein the processor includes
a first holding portion configured to hold the first signal,
a second holding portion configured to hold the second signal,
a third holding portion configured to hold a signal corresponding to charges of the third photoelectric converter, and
a fourth holding portion configured to hold the third signal, and
wherein the processor outputs the signal associated with the first signal held by the first holding portion, outputs the signal associated with the second signal held by the second holding portion, and outputs the signal associated with the third signal held by the fourth holding portion.

11. The solid-state image sensor according to claim 10, wherein the processor further includes a first noise level holding portion and a second noise level holding portion, each holding a signal corresponding to a noise level of the light-receiving pixel,
wherein the processor outputs, as the signal associated with the first signal, a signal corresponding to a difference between a signal held by the first holding portion and a signal held by the first noise level holding portion, and outputs, as the signal associated with the third signal, a signal corresponding to a difference between a signal held by the second holding portion and a signal held by the second noise level holding portion.

12. The solid-state image sensor according to claim 10, wherein the processor further includes a third noise level holding portion and a fourth noise level holding portion, each holding a signal corresponding to a noise level of the light-shielded pixel, and
wherein the processor outputs, as the signal associated with the third signal, a signal corresponding to a difference between a signal held by the fourth holding portion and a signal held by the fourth noise level holding portion.

13. The solid-state image sensor according to claim 9, wherein the light-receiving pixel outputs a signal corresponding to charges of the first photoelectric converter and a signal corresponding to charges of the second photoelectric converter, and the processor further includes an adding portion configured to add a signal corresponding to charges of the first photoelectric converter and a signal corresponding to charges of the second photoelectric converter from the light-receiving pixel.

14. The solid-state image sensor according to claim 13, wherein the addition portion includes
- a first input capacitor having one terminal connected to a column signal line to which a signal from the first photoelectric converter is output,
- a second input capacitor having one terminal connected to a column signal line to which a signal from the second photoelectric converter is output and the other terminal connected to the other terminal of the first input capacitor,
- an operational amplifier having a first input terminal to which the other terminal of the first input capacitor and the other terminal of the second input capacitor are connected, and a second input terminal to which a reference voltage is applied, and
- a feedback capacitor connected between the first input terminal and output terminal of the operational amplifier.

15. A camera comprising:
- a solid-state image sensor comprising a pixel array including a light-receiving pixel having a first photoelectric converter, a second photoelectric converter and one microlens provided in common for both the first photoelectric converter and the second photoelectric converter, and a light-shielded pixel having a third photoelectric converter and a fourth photoelectric converter, and a processor configured to process a signal from the pixel array; and
- a processing unit configured to process a signal output from the solid-state image sensor,
- wherein in a period, the processor holds (a) a first signal corresponding to charges of the first photoelectric converter, (b) a second signal obtained by adding a signal corresponding to charges of the first photoelectric converter and a signal corresponding to charges of the second photoelectric converter, and (c) a third signal obtained by adding a signal corresponding to charges of the third photoelectric converter and a signal corresponding to charges of the fourth photoelectric converter, and
- wherein the processor outputs (a) a signal associated with the first signal held in the period, (b) a signal associated with the second signal held in the period, and (c) a signal associated with the third signal held in the period, and the processor does not output (d) a signal corresponding to charges of the third photoelectric converter and a signal corresponding to charges of the fourth photoelectric converter.

* * * * *